United States Patent
Stewart

[11] 4,078,432
[45] Mar. 14, 1978

[54] FIBRE OPTIC PRESSURE SENSOR

[75] Inventor: William James Stewart, Towcester, England

[73] Assignee: Plessey Handel und Investments A.G., Zug, Switzerland

[21] Appl. No.: 750,979

[22] Filed: Dec. 15, 1976

[30] Foreign Application Priority Data
Dec. 18, 1975 United Kingdom ............... 51756/75

[51] Int. Cl.² .......................... G01L 9/00; G01L 7/08
[52] U.S. Cl. ...................................... 73/705; 73/715; 356/227
[58] Field of Search ................. 73/388 R, 406, 407 R, 73/398 R; 356/227

[56] References Cited
U.S. PATENT DOCUMENTS
3,789,667   2/1974   Porter et al. ........................... 73/406
FOREIGN PATENT DOCUMENTS
2,034,344   1/1972   Germany ............................. 250/227

Primary Examiner—Donald O. Woodiel
Attorney, Agent, or Firm—Fleit & Jacobson

[57] ABSTRACT

A fibre optic pressure sensor which includes at least two lengths of optical fibre each one of which is secured to a surface of a separate one of a number of spaced-apart member, at least one of which is resilient, the optical fibres being situated in the space between the said members and adapted to be brought into alignment when at least one of the said members is deflected by the application of external pressure to the sensor.

10 Claims, 6 Drawing Figures

FIBRE OPTIC PRESSURE SENSOR

This invention relates to a fibre optic pressure sensors and to fibre optic pressure sensing systems.

According to the invention there is provided a fibre optic pressure sensor which includes at least two lengths of optical fibre each one of which is secured to a surface of a separate one of a number of spaced-apart member, at least one of which is resilient, the optical fibres being situated in the space between the said members and adapted to be brought into alignment when at least one of the said members is deflected by the application of external pressure to the sensor.

The foregoing and other features according to the invention will be better understood from the following description of a preferred embodiment of the invention with references to the accompanying drawings, in which; -

Figure 1A:
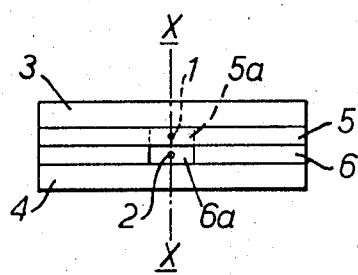
Figure 1B:
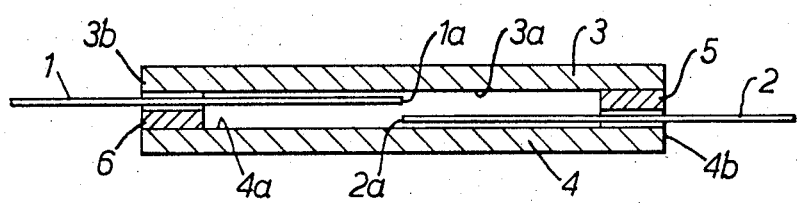
Figure 2:
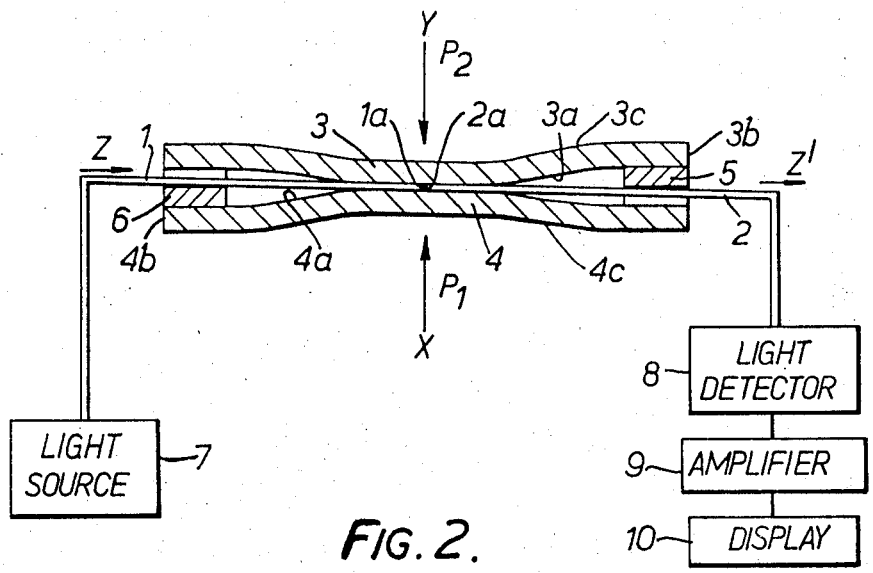
Figure 3:
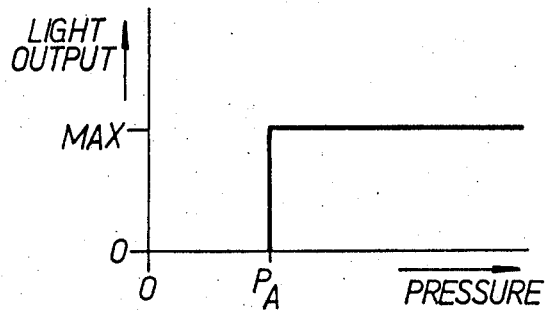
Figure 4:
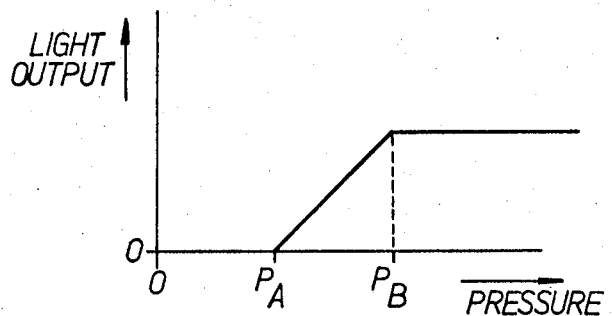
Figure 5:
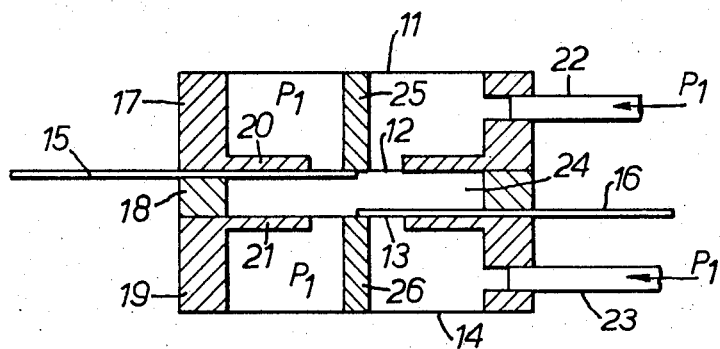

FIG. 1a diagrammatically illustrates, in an end view, a fibre optic pressure sensor according to the invention, FIG. 1b diagrammatically illustrates in a cross-sectional side elevation taken along the line X—X of FIG. 1a, the fibre optic pressure sensor FIG. 2 diagrammatically illustrates in a cross-sectional side elevation a fibre optic pressure sensing system incorporating the sensor of FIGS. 1a and 1b depicted after the application of an external force, and FIGS. 3 and 4 show step and ramp operating characteristics of the fibre optic pressure sensor FIG. 5 shows a fibre optic pressure sensor for sensing differential pressures.

With reference to FIGS. 1a and 1b of the drawings a fibre optic pressure sensor according to the invention is diagrammatically illustrated therein and consists of two lengths of optical fibre 1 and 2 each one of which can be coated with a metal. The optical fibres 1 and 2 are each suitably secured, for example, by an adhesive or spot welding in the case of metal coated fibres to separate surfaces 3a and 4a of a pair of resilient members 3 and 4 which in the preferred embodiment is disc shaped.

The optical fibre 1 is secured to the surface 3a of the resilient member 3 in a radial manner, so that an end face 1a thereof is positioned at the centre of the surface 3a. The remaining unsecured portion of the optical fibre 1 emerges nominally at right angles to the periphery 3b of the resilient member 3.

The optical fibre 2 is secured to the surface 4a of the resilient member 4 in a radial manner, so that an end face 2a thereof is positioned at the centre of the surface 4a. The remaining unsecured portion of the optical fibre 2 emerges nominally at right angles to the periphery 4b of the resilient member 4.

The two resilient members 3 and 4 are held in a spaced-apart, parallel relationship, by two rigid spacing members 5 and 6, such that the surfaces 3a and 4a face each other. The space between the surfaces 3a and 4a is greater than the combined diameters of the optical fibres 1 and 2.

The spacing members 5 and 6 are positioned one above the other at the edges of the surfaces 3a and 4a. Each spacing member is in the shape of an annulus which is pierced by a slot that admits an optical fibre to the interior of the sensor. Thus, the spacing member 5 possesses a slot 5a which admits the optical fibre 1 to the interior of the sensor, and the spacing member 6 possesses a slot 6a which admits the optical fibre 2 to the interior of the sensor. The depth of each slot 5a and 6a, is greater than the diameter of the optical fibres, 1 and 2, hence, the optical fibres are free to move within the slots 5a and 6a. The slots 5a and 6a of the spacing members 5 and 6 are orientated such that they are diametrically opposed so that optical fibres 1 and 2 admitted thereby lie in the same plane, and the end faces 1a and 2a thereof are spaced-apart and out of alignment.

With reference to FIG. 2 of the drawings, when pressures P1 P2 are respectively applied, in the directions indicated by the arrows X and Y respectively to the surface 3c and 4c of the resilient members 3 and 4, the surfaces 3c and 4c are caused to bow in a concave manner. Hence, the space between the resilient members 3 and 4 is reduced and if the pressures P1 and P2 are sufficient the end faces 1a and 2a of the optical fibres 1 and 2 are brought into alignment.

Referring now to FIG. 2, when a beam of light is projected by a light source 7 into the optical fibre 1 in a direction indicated by the arrow Z the light will propagate along the length of the optical fibre to emerge at the end face 1a. In the presence of an external pressure, as shown in FIG. 2, the emergent light from the end face 1a will, due to the alignment of the optical fibres 1 and 2 enter the optical fibre 2 at the end face 2a thereof, and then propagate in a direction indicated by the arrow Z, along the length of the optical fibre 2 to emerge at the other end thereof. In the absence of an external pressure, however, as depicted in FIGS. 1a and 1b, the emergent light from the end face 1a, will not propagate along the length of the optical fibre 2 due to the non alignment of the optical fibres. Any light entering fibre 2 is detected by a detector 8 and in a preferred embodiment the output of detector 8 is amplified in an amplifier 9 and the output of amplifier 9 is used to control a display 10.

In addition to the states of the sensor depicted in FIGS. 1b and 2, respectively, there are states representing intermediate values of pressure. The application of external pressures P1, P2 having an intermediate value to the resilient members 3 and 4 results in the partial alignment of the optical fibres 1 and 2. Hence, the quantity of light which enters, and propagates along, the optical fibre 2 is reduced. The quantity of light emerging from the optical fibre 2 in the direction of the arrow Z is in this instance a function of the degree of overlap between the optical fibres and thereby a function of the value of the external pressure applied to the resilient members 3 and 4. The output of light detector 7 will therefore, be proportional to the degree of overlap of the fibres and this will be displayed as a pressure by display 10.

Although, in the preceding description of a preferred embodiment of the invention, the optical fibres 1 and 2 are brought into alignment by the application of an external pressure to both of the resilient members 3 and 4. The optical fibre may be brought into alignment by the application of an external pressure to only one of the resilient members.

In the pressure sensor of FIGS. 1 and 2 the two spacing members 5 and 6 may be replaced by a single spacing member with appropriate diametrically opposed slots.

The pressure sensor of FIGS. 1 and 2 may be used as a differential pressure sensor by feeding a gas at a pressure P3 into the space within the resilient members 3 and 4. If the pressure P1 is equal to the P2 the sensor will sense the differential pressure (P1 − P3). Alternatively, the space within the resilient members 3 and 4 may be pressurised to a known pressure P4 and sealed. The sensor will then sense the differential pressure (P1 − P4).

In the case of a circular metallic diaphragm the displacement of the centre of the circular diaphragm (x) is given by the formula $$x = 0.012(1-O^2)D^4P/Yt^3$$

where D is the diameter of the disc of thickness (t) which is bowed under a pressure P, Y is the Youngs modulus and O is the Paisons ratio for the metal used.

A metallic diaphragm is chosen particularly where onerous conditions or high temperatures are encountered such as for example in the detection of pressures within a modern turbo-jet engine.

It is possible to produce a switch with a step function output as shown in FIG. 3 or with a ramp function output as shown in FIG. 4. In FIG. 4 the fibre optic pressure sensor detects no light output until a differential pressure PA is reached and then within a relatively small change in pressure the light output increases to a maximum indicating complete alignment of the fibres. During a fairly rapid change in pressure, therefore, the detector output will be a step function. This function can be obtained for example in the case of metallic diaphragms by choosing a material of relatively low Youngs modulus or a relatively thin diaphragm. The offset pressure PA can be chosen by suitable choice of the pressure within the pressure sensor in the case of a sealed sensor or may be determined by the pressure of the gas inside the sensor in the case where a further gas is introduced into the space within the pressure sensor.

To obtain a ramp function in a pressure sensor with metallic resilient members a material of higher Youngs modulus or of greater thickness can be used. By suitable choice of the spacing between the resilient members the pressure PA, at which the sensor commences to operate, can be chosen.

In an alternative embodiment where conditions are less onerous the diaphragms are made of a flexible material such as a rubber compound. Again by choice of the thickness of the diaphragm an effective step function or a ramp function can be obtained.

Where it is required to use a pressure sensor to sense a differential pressure between two gases such as exhaust gases which are impure, it is desirable to prevent direct contact between the impure gases and the ends of the optical fibres. Any prolonged contact would result in the ends of the fibres becoming dirty and in the case of a ramp function output would render the output pressure readings inaccurate. In the case of the step function sensor the output might become too low to be detected.

The pressure sensor shown in FIG. 5 overcomes this problem by isolating the optical fibres from the gases. Referring now to FIG. 5, the optical pressure sensor comprises four flexible and/or resilient circular diaphragms 11, 12, 13, 14 optical fibres 15, 16 being secured to the inner surfaces of diaphragms 12 and 13 in a similar manner to fibres 1 and 2 of FIGS. 1 and 2. The diaphragms 11, 12, 13, 14 are held in a spaced relationship as shown by annular spacing members 17, 18 and 19. The diaphragms are sealed to the annular spacing members by glueing or other appropriate sealing methods. In a preferred embodiment the diaphragms 12 and 13 are considerably smaller in diameter than the diaphragms 11 and 14 this being accomplished by constructing annular spacing members 17 and 19 with respective inward flanges 20 and 21. The diaphragms 12 and 13 are sealed onto the inner edges of the flanges 20 and 21 respectively.

Inlets 22, 23 for gas at a pressure P1 are provided in the respective annular spacing members 17, 18. Gas at a pressure P2 is assumed to be on the outside of the pressure sensor as indicated by the arrows. The internal space 24 within the sensor may be filled with an inert gas at a pressure P3 or could be evacuated. Diaphragms 11 and 12 and 13 and 14 are joined together by rigid pillars 25, 26 respectively.

If the space 24 is evacuated the sensor will thus sense the difference (P1−P2) in pressures since both pressures are applied to opposite ends of diaphragms 11 and 14.

If the space 24 is pressurised to a low pressure P3 the sensor may still effectively be used to measure the differential pressure (P1−P2) providing that the ratio of the areas of outer diaphragms 11 and 14 to inner diaphragms 12 and 13 is high. This is relatively easily obtained since the areas are proportional to the square of the diameters and the pillars 25, 26 take up some of the area.

By varying pressure P3 and the ratio of the areas of the diaphragms it is possible to alter the pressure PA (FIGS. 3, 4) at which the differential pressure sensor commences to operate.

In a preferred embodiment diaphragms 11, 12, 13 and 14 will be metallic to withstand the onerous conditions of temperature and impurity of the gases in the pressure sensor of FIG. 5. A suitable metal is stainless steel and for high temperature uses the fibre should preferably have a metallic coating or other coating capable of withstanding high temperatures as opposed to the more normal plastic coating which will not stand temperatures of 400° C experienced in for example engine exhaust gases.

What is claimed is:

1. A fibre optic pressure sensor which includes at least two lengths of optical fibre each one of which is secured to a surface of a separate one of a number of spaced-apart members, at least one of which is resilient, the optical fibres being situated in the space between the said members and adapted to be brought into alignment with each other when at least one of the said members is deflected by the application of external pressure to the sensor, wherein at least one of said optical fibres is adapted to transmit light applied to said optical fibre externally of the pressure sensor, and the other optical fibre is adapted to transmit light received from the one optical fibre, when in at least partial alignment therewith, to a detector.

2. A fibre optic pressure sensor as claimed in claim 1 wherein the optical fibres are covered with a metallic coating.

3. A fibre optic pressure sensor as claimed in claim 2 wherein the members are held apart by at least one spacing member.

4. A fibre optic pressure sensor as claimed in claim 3 wherein the spacing member is pierced by a number of mutually opposed apertures, the depth of each of the apertures determining the spacing distance of the optical fibres.

5. A fibre optic pressure sensor as claimed in claim 1 comprising two spaced-apart resilient members and in which the members are metallic diaphragms.

6. A pressure sensing system including a light source, a pressure sensor, said pressure sensor comprising at least two lengths of optical fibre each one of which is secured to a surface of a separate one of a number of spaced-apart members, at least one of which is resilient, the optical fibres being situated in the space between the said members and adapted to be brought into alignment when at least one of the said members is deflected by the application of external pressure to the sensor, said light source being connectable to a first one of said fibres, light detection means connected to a second one of said fibres for the detection of light transmitted by said first one of said fibres on alignment of said first and second fibres, amplifier means for the amplification of the output of said light detector means and display means for the display of the output of said amplification means.

7. A pressure sensing system as claimed in claim 6 in which the display means is calibrated to read the differential pressure of gases applied to the optical pressure sensor.

8. A fibre optic pressure sensor as claimed in claim 1 including four spaced-apart members each of which is resilient, three spacing members to which said four members are sealed, said three spacing members and said four spaced-apart members forming first, second and third containers, in which the optical fibres are secured to the inner surfaces of the two innermost spaced apart members and sealed to a first one of said spacing members to form a said first container sealed from said second and third containers and in which said second and third containers are each provided with an inlet for the input of pressurised gases.

9. A fibre optic pressure sensor as claimed in claim 1, wherein said at least two lengths of optical fibre are each secured to a separate spaced-apart member and lie in a common plane substantially parallel to each other, and wherein each optical fibre has a free end face in spaced-apart relationship with each other such that when at least one of said spaced-apart members is deflected, the optical fibres are adapted to align such that said free end faces are in face-to-face relationship.

10. A fibre optic pressure sensor comprising a pair of members, a spacing member means for supporting said members in spaced-apart substantially parallel relationship, a pair of optical fibres having free end faces, means for securing each optical fibre to a separate member, so that the optical fibres lie in a common plane substantially perpendicular to said substantially parallel members, each optical fibre extending through said spacing member means, at least one of said members being deformable in response to an externally applied pressure such that the optical fibre secured thereto moves into a position wherein its free end face becomes at least partially aligned with the free end face of the optical fibre secured to the other member, wherein at least one optical fibre is adapted to transmit light applied to said optical fibre externally of the pressure sensor, and the other optical fibre is adapted to transmit light received from the one optical fibre, when in at least partial alignment therewith, to a light detector.

* * * * *